(12) United States Patent
Faucher et al.

(10) Patent No.: US 8,563,627 B2
(45) Date of Patent: *Oct. 22, 2013

(54) SELF EMULSIFYING GRANULES AND PROCESS FOR THE PREPARATION OF EMULSIONS THEREFROM

(75) Inventors: Santiago Faucher, Oakville (CA); Joo T. Chung, Webster, NY (US); Shigang Qiu, Toronto (CA); Fumii Higuchi, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 943 days.

This patent is subject to a terminal disclaimer.

(21) Appl. No.: 12/512,174

(22) Filed: Jul. 30, 2009

(65) Prior Publication Data

US 2011/0027710 A1    Feb. 3, 2011

(51) Int. Cl.
*B01F 3/08*    (2006.01)

(52) U.S. Cl.
USPC ............. 523/322; 430/108.1; 430/108.2; 430/108.23; 430/109.4

(58) Field of Classification Search
USPC ............ 430/108.1, 108.2, 108.23, 109.4; 523/322
See application file for complete search history.

(56) References Cited

U.S. PATENT DOCUMENTS

| | | | |
|---|---|---|---|
| 3,933,954 A | 1/1976 | Gebhard et al. | |
| 4,056,653 A | 11/1977 | Gebhard et al. | |
| 5,278,020 A | 1/1994 | Grushkin et al. | |
| 5,290,654 A | 3/1994 | Sacripante et al. | |
| 5,302,486 A | 4/1994 | Patel et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,354,804 A | 10/1994 | Inada et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,496,676 A | 3/1996 | Croucher et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,723,253 A | 3/1998 | Higashino et al. | |
| 5,744,520 A | 4/1998 | Kmiecik-Lawrynowicz et al. | |
| 5,747,215 A | 5/1998 | Ong et al. | |
| 5,763,133 A | 6/1998 | Ong et al. | |
| 5,766,818 A | 6/1998 | Smith et al. | |
| 5,804,349 A | 9/1998 | Ong et al. | |
| 5,827,633 A | 10/1998 | Ong et al. | |
| 5,840,462 A | 11/1998 | Foucher et al. | |
| 5,853,943 A | 12/1998 | Cheng et al. | |
| 5,853,944 A | 12/1998 | Foucher et al. | |
| 5,863,698 A | 1/1999 | Patel et al. | |
| 5,869,215 A | 2/1999 | Ong et al. | |
| 5,902,710 A | 5/1999 | Ong et al. | |
| 5,910,387 A | 6/1999 | Mychajlowskij et al. | |
| 5,916,725 A | 6/1999 | Patel et al. | |
| 5,925,488 A | 7/1999 | Patel et al. | |
| 5,977,210 A | 11/1999 | Patel et al. | |
| 5,994,020 A | 11/1999 | Patel et al. | |
| 6,080,807 A | 6/2000 | Campbell | |
| 6,512,024 B1 | 1/2003 | Lundgard et al. | |
| 7,064,156 B2 | 6/2006 | Rink et al. | |
| 7,385,001 B2 | 6/2008 | Shim et al. | |
| 8,211,604 B2 * | 7/2012 | Faucher et al. | ............ 430/108.1 |
| 2008/0107989 A1 | 5/2008 | Sacripante et al. | |

FOREIGN PATENT DOCUMENTS

WO    9845356    10/1998
WO    0017256    3/2000

* cited by examiner

*Primary Examiner* — Edward Cain
(74) *Attorney, Agent, or Firm* — Judith L. Byorick

(57) ABSTRACT

A process for making a self-emulsifying granule suitable for use in forming latex emulsions includes contacting a resin with a solid or highly concentrated surfactant, a solid neutralization agent and water in the absence of an organic solvent to form a mixture, melt mixing the mixture, and forming self-emulsifying granules of the melt mixed mixture. Self-emulsifying granules are also provided and configured to form a latex emulsion when added to water, which may then be utilized to form a toner.

20 Claims, 4 Drawing Sheets

SELF EMULSIFYING GRANULES AND PROCESS FOR THE PREPARATION OF EMULSIONS THEREFROM

CROSS REFERENCE TO RELATED APPLICATIONS

The present application relates to co-pending U.S. patent application Ser. No. 12/512,301 filed Jul. 30, 2009, the disclosure of which is hereby incorporated by reference in its entirety.

TECHNICAL FIELD

The present disclosure relates to self-emulsifying granules useful in producing a latex emulsion in the preparation of toners.

BACKGROUND

Numerous processes are within the purview of those skilled in the art for the preparation of toners. Emulsion aggregation (EA) is one such method. Emulsion aggregation toners may be used in forming print and/or xerographic images. Emulsion aggregation techniques may involve the formation of an emulsion latex of the resin particles, by heating the resin, using a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,278,020, 5,290,654, 5,302,486, 5,308,734, 5,344,738, 5,346,797, 5,348,832, 5,364,729, 5,366,841, 5,370,963, 5,403,693, 5,405,728, 5,418,108, 5,496,676, 5,501,935, 5,527,658, 5,585,215, 5,650,255, 5,650,256, 5,723,253, 5,744,520, 5,763,133, 5,766,818, 5,747,215, 5,804,349, 5,827,633, 5,840,462, 5,853,944, 5,869,215, 5,863,698; 5,902,710; 5,910,387; 5,916,725; 5,919,595; 5,925,488, 5,977,210, 5,994,020, and U.S. Patent Application Publication No. 2008/01017989, the disclosures of which are hereby incorporated by reference in their entirety.

Polyester toners exhibiting low melt properties have been prepared utilizing amorphous and crystalline polyester resins as illustrated, for example, in U.S. Patent Application Publication No. 2008/0153027, the disclosure of which is hereby incorporated by reference in its entirety.

Polyester toners have been prepared using polyester resins to achieve low melt behavior, enabling faster print speeds and lower energy consumption. However, the incorporation of these polyesters into the toner requires that they first be formulated into latex emulsions prepared by solvent containing processes, for example solvent flash emulsification and/or solvent-based phase inversion emulsification. In both cases, large amounts of organic solvents such as ketones or alcohols have been used to dissolve the resins, which may require subsequent energy intensive distillation to form the latexes, and may require the removal of residual solvent from wastewaters in the toner making process. These processes are thus not environmentally friendly. Solventless latex emulsions have been formed in either a batch or extrusion process through the addition of a neutralizing solution, a surfactant solution and water to a thermally softened resin as illustrated, for example, in U.S. patent application Ser. Nos. 12/032,173 and 12/056,529, the disclosures of each of which are hereby incorporated by reference in their entirety.

Improved methods for producing toners, which reduce the number of stages and materials, remain desirable. Such processes may reduce production costs for such toners and may be environmentally friendly.

SUMMARY

Processes for preparing self-emulsifying granules useful in producing a latex emulsion in the preparation of toners are disclosed. A process is provided which includes the steps of contacting a resin with a highly concentrated surfactant, a neutralizing agent, and water in the absence of an organic solvent to form a mixture; melt mixing the mixture; and forming self-emulsifying granules of the melt mixed mixture of from about 0.5 cm to about 2 cm in diameter.

A process for preparing an ultra low melt polyester toner is provided which includes the steps of contacting a resin with a highly concentrated surfactant, a neutralizing agent, and water in the absence of an organic solvent to form a mixture; melt mixing the mixture; forming self-emulsifying granules of the melt mixed mixture of from about 0.5 cm to about 2 cm in diameter; adding water to the self-emulsifying granules when desired to form a latex emulsion; and optionally adding one or more additional ingredients of a toner composition to the resin.

Self-emulsifying granules useful in producing a latex emulsion in the preparation of toners is also disclosed. A self-emulsifying granule is provided which includes at least one polyester resin in the absence of an organic solvent; a highly concentrated surfactant; a neutralization agent; and water; wherein the self-emulsifiable granule forms a latex emulsion upon contact with water.

BRIEF DESCRIPTION OF DRAWINGS

Various embodiments of the present disclosure will be described herein below with reference to the figures wherein.

DETAILED DESCRIPTION

Previous disclosures cited above describe processes for making solvent free latexes in batch and extruder processes. These processes do not, however, explore the production of solid granules and use of such granules in the formation of latexes on demand.

The present disclosure provides processes for forming self-emulsifying granules of resins. These resin granules, in turn, may then be utilized to form a latex emulsion containing latex particles which may be utilized to make toners. In embodiments, a process of the present disclosure includes contacting a resin with a surfactant, a neutralization agent and water in the absence of an organic solvent to form a mixture; melt mixing the mixture; and forming self-emulsifying granules of the melt mixed mixture of from about 0.5 cm to about 2 cm, in embodiments of from about 0.8 cm to about 1.2 cm, although values outside these ranges may be obtained.

The present disclosure also provides processes for producing a latex emulsion containing latex particles to form a toner. In embodiments, a process of the present disclosure includes contacting a resin with a surfactant, a neutralization agent and water in the absence of an organic solvent to form a mixture; melt mixing the mixture; forming self-emulsifying granules of the melt mixed mixture of from about 0.5 cm to about 2 cm; adding water to the self-emulsifying granules when desired to provide a latex emulsion; and optionally adding one or more additional ingredients of a toner composition such as colorant, wax, and other additives to the above mixture to form a toner.

The present disclosure also provides a self emulsifying granule having at least one polyester resin in the absence of an organic solvent; a solid or highly concentrated surfactant; a neutralization agent; and water; wherein the self-emulsifying granule forms a latex emulsion upon contact with water.

As used herein, "the absence of an organic solvent" includes, in embodiments, for example, that organic solvents are not used to dissolve the resin for emulsification. However, it is understood that minor amounts of such solvents may be present in such resins as a consequence of their use in the process of forming the resin.

As used herein, a "highly concentrated surfactant" includes, in embodiments, for example, a surfactant having a high solids concentration of from about 10% to about 100%, in embodiments from about 15% to about 95%.

However, it is understood that a lower concentration of such solids may be present in surfactants used in accordance with the present disclosure.

Resins

Any resin may be utilized in forming a self emulsifiable composite of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 50 percent by weight of the toner components, in embodiments from about 10 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as descried above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin), Where the resin includes an amorphous resin and a crystalline resin, the weight ratio of the two resins may be from about 99% (amorphous resin):1% (crystalline resin), to about 1% (amorphous resin):90% (crystalline resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Neutralizing Agent

Once obtained, the resin may be melt-mixed at an elevated temperature, with a highly concentrated base or neutralizing agent added thereto. In embodiments, the base may be a solid or, added in the form of a highly concentrated solution.

In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, organoamines such as triethyl amine, combinations thereof, and the like. Suitable basic agents may also include monocyclic compounds and polycyclic compounds, having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polyclic compounds may be unsubstituted or substituted at any carbon position on the ring.

In embodiments, a self-emulsifying granule formed in accordance with the present disclosure may also include a small quantity of water, in embodiments, de-ionized water (DIW), in amounts of from about 5% to about 30%, in embodiments, of from about 8% to about 25%, at temperatures that melt or soften the resin, of from about 70° C. to about 120° C., in embodiments from about 75° C. to about 95° C., and at least one neutralizing agent.

The basic agent may be utilized so that it is present in an amount of from about 0.001% by weight to 50% by weight of the resin, in embodiments from about 0.01% by weight to about 25% by weight of the resin, in embodiments from about 0.1% by weight to 5% by weight of the resin, although amounts outside these ranges may be used.

Utilizing the above basic neutralization agent in combination with a resin possessing acid groups, a neutralization ratio of from about 50% to about 300% may be achieved, in embodiments from about 70% to about 200%, although values outside these ranges may be obtained. In embodiments, the neutralization ratio may be calculated using the following equation:

$$\text{Neutralization ratio in percentile is equal to number of base moieties used divided by number of resin acid groups present multiplied by 100\%.}$$

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11, although values outside these ranges may be obtained. The neutralization of the acid groups may, in embodiments, enhance formation of the emulsion.

Surfactants

In embodiments, the process of the present disclosure may include adding a surfactant, before or during the melt mixing, to the resin at an elevated temperature. In embodiments, the surfactant may be added prior to melt-mixing the resin at an elevated temperature. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a highly concentrated solution with a concentration of from about 10% to about 100% (pure surfactant) by weight, in embodiments, from about 50% to about 95% by weight, although amounts outside these ranges may be used. In embodiments, the surfactant may be utilized so that it is present in an amount of from about 0.01% to about 30% by weight of the resin, in embodiments, from about 0.1% to about 25% by weight of the resin, in other embodiments, from about 1% to about 14% by weight of the resin, although amounts outside these ranges may be used.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing nonionic surfactants may be utilized in embodiments.

Processing

As noted above, the present process includes melt mixing a mixture containing a resin, a solid or highly concentrated surfactant, a neutralizing agent and optionally, water at an elevated temperature, wherein an organic solvent is not utilized in the process, to form self-emulsifying granules. More than one resin may be utilized in forming the granules. As noted above, the resin may be an amorphous resin, a crystalline resin, or a combination thereof. In embodiments, the resin may be an amorphous resin and the elevated temperature may be a temperature above the glass transition temperature of the resin. In other embodiments, the resin may be a crystalline resin and the elevated temperature may be a temperature above the melting point of the resin. In further embodiments, the resin may be a mixture of amorphous and crystalline resins and the temperature may be above the glass transition temperature of the mixture.

Thus, in embodiments, the process of making the polyester resin granules to be emulsified includes melt mixing the resin for a short period of time with a highly concentrated or solid neutralizing agent, a highly concentrated or solid surfactant, and optionally, a small quantity of water at temperatures that melt or soften the resin.

In embodiments, the surfactant may be added to the one or more ingredients of the resin composition before, during, or after melt-mixing. In embodiments, the surfactant may be added before, during, or after the addition of the neutralizing agent. In embodiments, the surfactant may be added prior to the addition of the neutralizing agent.

In the above-mentioned heating, the elevated temperature may be from about 30° C. to about 300° C., in embodiments from about 50° C. to about 200° C., in other embodiments from about 70° C. to about 150° C., although temperatures outside these ranges may be used. The heating need not be held at a constant temperature, but may be varied. For example, the heating may be slowly or incrementally increased during heating until a desired temperature is achieved.

Melt mixing may be conducted in an extruder, i.e. a twin screw extruder, a Haake mixer, a batch reactor, or any other device capable of intimately mixing viscous materials to create near homogenous mixtures.

Prior to addition, the basic neutralization agent may be at any suitable temperature, including room temperature of from about 20° C. to about 25° C., or an elevated temperature, for example, the elevated temperatures mentioned above.

In embodiments, the resin may be added to the mixer with the solid or highly concentrated surfactant and the neutralizing agent and mixed for a period of about 30 seconds to about 40 minutes, in embodiments, from about 1 minute to about 25 minutes, in other embodiments, from about 2 minutes to about 15 minutes, although times outside these ranges may be utilized.

The self emulsifying material exiting the melt mixer may then be cooled to room temperature and forms a solid material that may be easily crushed, cut or pelletized into granules. In embodiments, the solid material may be pelletized into granules having an average diameter of from about 0.1 cm to about 2 cm, in embodiments, from about 0.5 cm to about 1.5 cm, in other embodiments, from about 0.8 cm to about 1.2 cm, although sizes outside these ranges may be obtained.

The self emulsifying granules may be shipped and stored for prolonged periods of time without affecting the material properties of the resin. In embodiments, the granules may be stored for periods of from about 1 day to about 50 days, in other embodiments, of from about 2 days to 45 days, although time periods outside these ranges may be obtained.

The self-emulsifiable granules of the present disclosure offer many of the following advantages over the prior art: Low coarse content, tight particle size distributions and particle sizes appropriate for emulsion aggregation toner manufacturing; no homogenizers or other dispersing devices for the preparation of latexes; no filtration to eliminate coarse particles; latex production on demand from a convenient solid material; long term stability against biological degradation; reduced shipping and warehousing costs; lower carbon footprint.

The granules of the present disclosure may then be utilized to produce particle sizes that are suitable for emulsion aggregation processes, using crystalline and/or amorphous polyester resins. The granules produce latexes with a low coarse content without the use of homogenization or filtration. Preparation of self emulsifying granules reduces the carbon footprint simply by reducing the volume of material to be shipped between production and consumption facilities thereby reducing latex shipping charges.

Emulsion Formation

When convenient or desired, the granular material may then be added to water to form a latex emulsion. Water may be added in an amount of from about 50% to about 10000% of the granule mass, in embodiments, of from about 150% to about 10000%. While higher water temperatures accelerate the dissolution process, latexes can be formed at temperatures as low as room temperature. In embodiments, water temperatures may be from about 40° C. to about 110° C., in embodiments, from about 50° C. to about 100° C., although temperatures outside these ranges may be used.

Contact between the water and granules may be achieved in any suitable manner, such as in a vessel or continuous conduit, in a packed bed or dilute regime. In a batch process, the granules may be added to a hot water bath with low agitation and left to form the latex. In other embodiments, the granules may be held by a sieving device and water may flow through a filter cake of the granules or, alternatively, in embodiments, over a bed of granules until they dissolve into a latex form.

The particle size of the latex emulsion formed can be controlled by the concentration ratio of surfactant and neutralizer to polyester resin. The solids concentration of the latex may be controlled by the ratio of the granular material to the water.

In accordance with the present disclosure, it has been found that the processes herein may produce emulsified resin particles that retain the same molecular weight properties of the starting resin, in embodiments, bulk or pre-made resin utilized in forming the emulsion.

Figure 1:
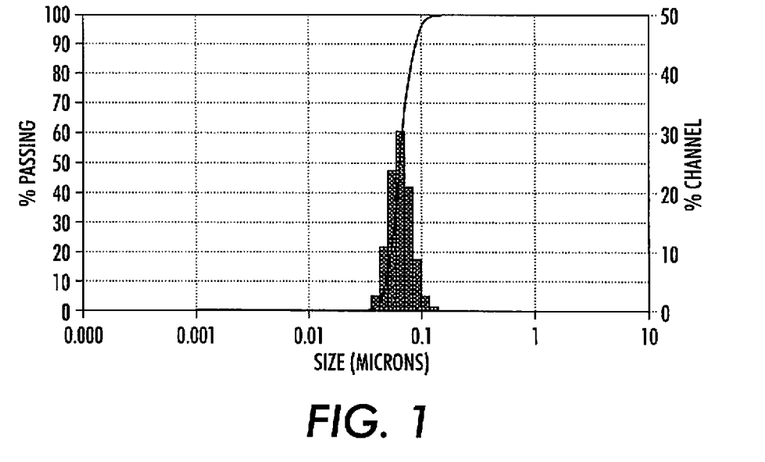
FIG. 1 is a graph depicting particle sizes of emulsions produced in accordance with an embodiment of the present disclosure.

The emulsified resin particles in the aqueous medium may have a size of about 1500 nm or less, such as from about 10 nm to about 1200 nm, in embodiments from about 30 nm to about 1000 nm, as shown in FIG. 1, which is a graph depicting suitable particle sizes as obtained by a Microtrac Ing. Nanotrac particle size analyzer.

Following emulsification, additional surfactant, water, and/or aqueous alkaline solution may optionally be added to dilute the emulsion, although this is not required. Following emulsification, the emulsion may be cooled to room temperature, for example from about 20° C. to about 25° C.

Toner

Once the self-emulsifying granules have been contacted with water to form an emulsion as described above, the resulting latex may then be utilized to form a toner by any method within the purview of those skilled in the art. The latex emulsion may be contacted with a colorant, optionally in a dispersion, and other additives to form a toner by a suitable process, in embodiments, an emulsion aggregation and coalescence process.

In embodiments, the optional additional ingredients of a toner composition including colorant, wax, and other additives may be added before, during or after the melt mixing the resin to form the self-emulsifying granules. The additional ingredients may be added before, during or after the formation of the latex emulsion, wherein the self-emulsifying granule is contacted with water. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Pennanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850: 1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido)phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Coagulants

Optionally, a coagulant may also be combined with the resin, a colorant and a wax in forming toner particles. Such coagulants may be incorporated into the toner particles during particle aggregation. The coagulant may be present in the toner particles, exclusive of external additives and on a dry weight basis, in an amount of, for example, from about 0 weight percent to about 5 weight percent of the toner particles, in embodiments from about 0.01 weight percent to about 3 weight percent of the toner particles, although the amount of coagulant can be outside of these ranges.

Coagulants that may be used include, for example, an ionic coagulant, such as a cationic coagulant. Inorganic cationic coagulants include, metal salts, for example, aluminum sulfate, magnesium sulfate, zinc sulfate, potassium aluminum sulfate, calcium acetate, calcium chloride, calcium nitrate, zinc acetate, zinc nitrate, aluminum chloride, and the like.

Examples of organic cationic coagulants include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and the like, and mixtures thereof.

Other suitable coagulants include, a monovalent metal coagulant, a divalent metal coagulant, a polyion coagulant, or the like. As used herein, "polyion coagulant" refers to a coagulant that is a salt or oxide, such as a metal salt or metal oxide, formed from a metal species having a valence of at least 3, and desirably at least 4 or 5. Suitable coagulants thus include, for example, coagulants based on aluminum salts, such as aluminum sulphate and aluminum chlorides, polyaluminum halides such as polyaluminum fluoride and polyaluminum chloride (PAC), polyaluminum silicates such as polyaluminum sulfosilicate (PASS), polyaluminum hydroxide, polyaluminum phosphate, and the like.

Other suitable coagulants also include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, in embodiments, suitable polyaluminum compounds have from about 2 to about 13, in other embodiments, from about 3 to about 8, aluminum ions present in the compound.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

Preparation of self-emulsifiable granules based on a crystalline polyester resin in a Haake mixer and their subsequent emulsification in a batch process.

Figure 2:
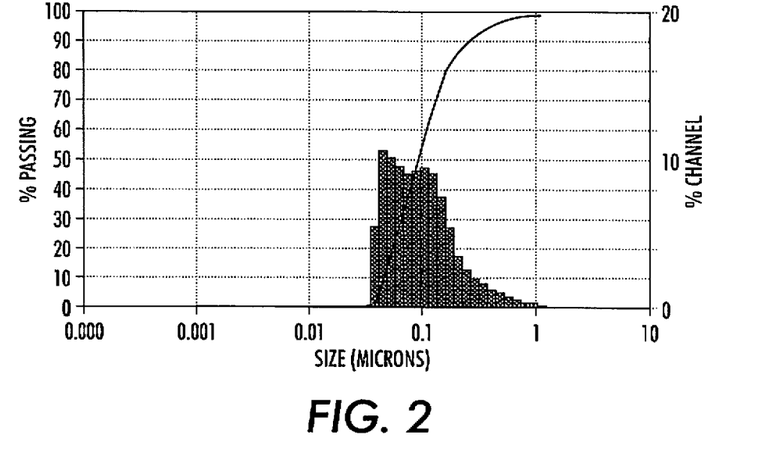
FIG. 2 is a graph depicting particle sizes of emulsions produced in accordance with an embodiment of the present disclosure.

A Haake melt mixer equipped with counter-rotating rotors was preheated to about 95° C. and then set to a rotor speed of about 100 rpm. Approximately 50 grams of a poly(nonylene-decanoate)crystalline polyester resin, about 8 grams of sodium dodecyl benzene sulfonate, and about 0.74 grams NaOH was added to the cavity of the mixer and the material was mixed for about 15 minutes. About 4.9 grams of water was then added to the mixer cavity over about 10 minutes and then left to melt mix with the resin for an additional 10 minutes. The product was collected from the Haake mixer cavity and solidified upon cooling. The solid material was crushed by hand into granules approximately 1 cm in diameter. The granules were then added to about 400 grams of de-ionized water having a temperature of about 95° C. while continuously stirring to form a latex. Particle sizes of the resulting resin were obtained by a Microtrac Inc. Nanotrac Particle Size analyzer, with particle size distribution as shown in FIG. 2. The number and volume average particle sizes for the latex were about 56 nm and about 133 nm respectively.

Example 2

Preparation of self-emulsifiable granules based on an amorphous polyester resin in a Haake mixer and their subsequent emulsification in a batch process.

Figure 3:
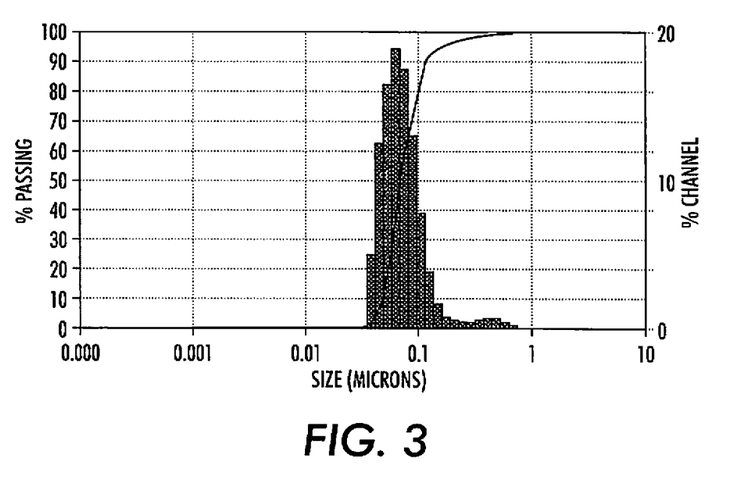
FIG. 3 is a graph depicting particle sizes of emulsions produced in accordance with an embodiment of the present disclosure.

A Haake melt mixer equipped with counter-rotating rotors was preheated to about 95° C. and then set to a rotor speed of about 100 rpm. About 50 grams of a propoxylated bisphenol A terphthalic acid amorphous polyester resin, about 11.4 grams of sodium dodecyl benzene sulfonate, and about 1.27 grams of NaOH was added to the cavity of the mixer and the material was mixed for about 15 minutes. About 11.4 grams of water was added to the mixer cavity over about 10 minutes and then left to melt mix with the resin for an additional 10 minutes. The product was collected from the Haake mixer cavity and solidified upon cooling. The solid material was crushed by hand into granules approximately 1 cm in diameter. The granules were added to about 400 grams of de-ionized water having a temperature of about 95° C. while stirring to form a latex. Particle sizes of the resulting resin were determined by a Microtrac Inc. Nanotrac Particle Size analyzer, with particle size distribution as shown in FIG. 3. The number and volume average particle sizes for the latex were about 56 nm and about 86 nm respectively.

Example 3

Preparation of self-emulsifiable granules based on an amorphous polyester resin in an extruder and subsequent emulsification in a batch process.

Figure 4:
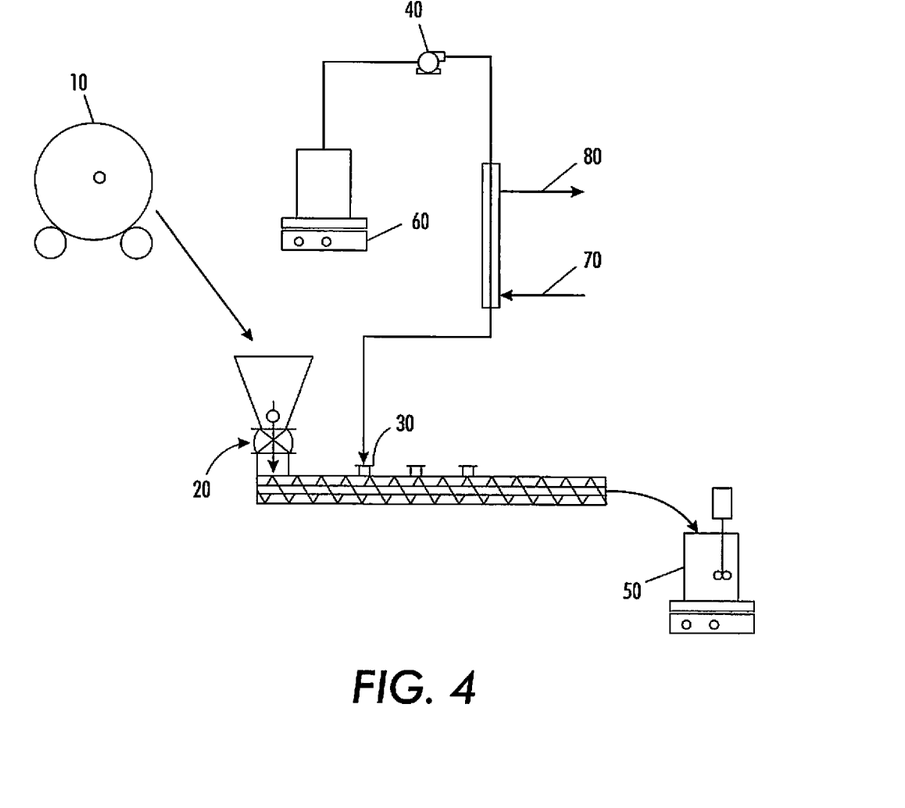
FIG. 4 is a flow chart depicting an extruder process for the preparation of granules in accordance with the present disclosure.

An extruder equipped with a feed hopper and liquid injection ports was preheated to about 95° C. and set to a rotor speed of about 450 rpm. About 225 grams of sodium dodecylbenzene sulfonate (about 5 wt %), about 149 grams of NaOH (about 3.3 wt %) and about 4.5 kilograms of a low molecular weight Kao XL1 amorphous polyester resin was mixed in tumbler 10 and then fed into the extruder 20 as illustrated in FIG. 4. About 9.9 kg of preheated de-ionized water at room temperature (from about 20° C. to about 25° C.) was fed to the extruder's first injection port 30 at a feed rate of about 120 ml per minute via a diaphragm pump 40. At the exit of pump 40 and prior to entering the first injection port 30, the water is heated by a shell and tube heat exchanger that utilizes steam entering the system at port 70 and exiting the system at port 80. About 25 grams of a sample of the extrudate was removed, cooled and stored in a dry place. Approximately 21 days later, about 19.83 grams of the solid extrudate was unchanged with time in the granular material. In Example 3, granules produced from the extruder had resin molecular weights of about 8.6 and about 2.5 kDa ($M_w$ and $M_n$) at an age of about 6 days and molecular weights of about 8.8 and about 2.7 kDa ($M_w$ and $M_n$) at an age of about 21 days (differences between the molecular weights reported are within the accuracy of the Gel Permeation Chromatography (GPC) measurement technique). Following aging, the granules were added to water to form a latex and the latex was left to dry so that the resin molecular weight could be again measured by GPC. The molecular weight of the resin in the dried latex was the same as that in the granules ($M_w$=8.4 and $M_n$=2.6 kDa) even after having been stored for 21 days. Similar retention of polymer molecular weights in the granules were observed for the other examples. The granules can therefore be stored for long periods of time without adversely affecting the resin properties.

TABLE 1

Resin Molecular Weights in Granule and Latex Forms as a Function of Time

Figure 5:
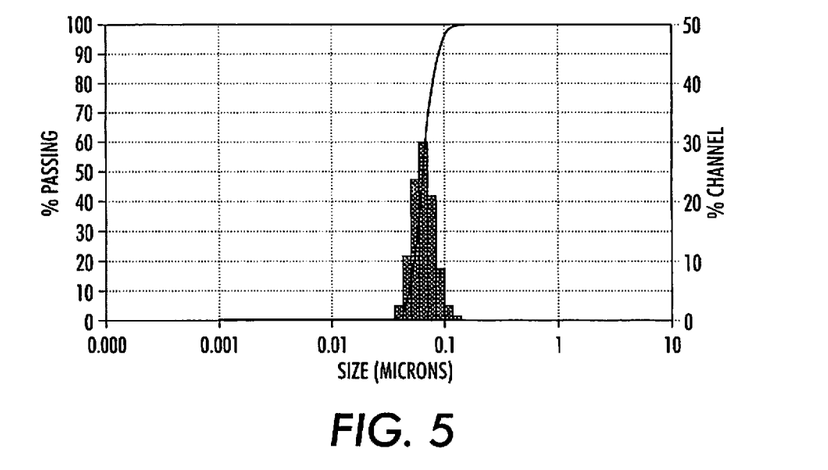
FIG. 5 is a graph depicting particle sizes of emulsions produced in accordance with an embodiment of the present disclosure.

| | | | Resin Molecular Weights in Granules (kDa) and Age (days) at time of assay | | | | | | Resin Molecular Weights in Latex (kDa) | | |
|---|---|---|---|---|---|---|---|---|---|---|---|
| | | | Original | | | Aged | | | | | |
| Example | Process | Resin | $M_w$ | $M_n$ | Age | $M_w$ | $M_n$ | Age | $M_w$ | $M_n$ | Age |
| 1 | Haake | crystalline | NA | NA | NA | 17.8 | 5.3 | 39 | 16.8 | 4.9 | 5 |
| 2 | Haake | amorphous | 9.6 | 2.5 | 2 | NA | NA | NA | 10.3 | 2.7 | 2 |
| 3 | Extruder | amorphous | 8.6 | 2.5 | 6 | 8.8 | 2.7 | 21 | 8.4 | 2.6 | 23 |
| 4 | Haake | crystalline 10 wt % amorphous 90 wt % | 6.5 | 2.1 | 7 | 6.4 | 2.0 | 42 | 6.6 | 2.1 | 8 | crushed by hand into granules and added to about 160 grams of de-ionized water in container 50 preheated to a temperature of about 90° C. About 8 wt % of a latex emulsion formed within a few hours. A sample was taken for particle size analysis. The resulting particle size distribution is shown in FIG. 5. The number and volume average particle sizes for the latex formed were about 58 nm and about 67 nm respectively.

Example 4

Preparation of self-emulsifiable granules based on an amorphous and crystalline polyester resin in a Haake mixer and subsequent emulsification in a batch process.

Figure 6:
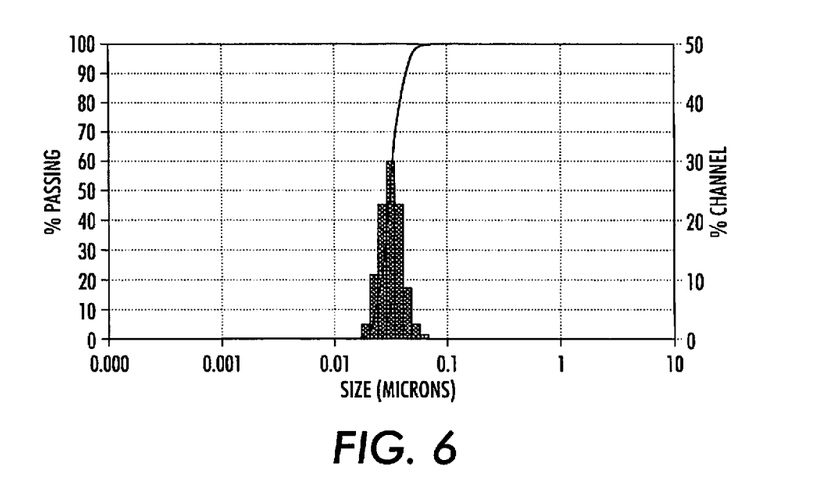
FIG. 6 is a graph depicting particle sizes of emulsions produced in accordance with an embodiment of the present disclosure.

A Haake melt mixer equipped with counter-rotating rotors was preheated to about 95° C. and then set to a rotor speed of about 100 rpm. About 45 grams of a propoxylated bisphenol. A terphthalic acid amorphous polyester resin, about 5 grams of a poly(nonylene-decanoate)crystalline polyester resin, about 4 grams of sodium dodecyl benzene sulfonate, and about 1.1 grams of NaOH were added to the cavity of the mixer and the material was mixed for about 15 minutes. About 8 grams of water was added to the mixer cavity over about 10 minutes and left to melt mix with the resin for an additional 10 minutes. The product was collected from the Haake mixer cavity and solidified upon cooling. The solid material was crushed by hand to granules approximately 1 cm in diameter. The granules were added to about 400 grams of de-ionized water having a temperature of about 95° C. to form a latex. Particle size analysis was conducted with particle size distribution as shown in FIG. 6. The number and volume average particle sizes for the latex formed were about 29 nm and about 34 nm respectively.

Table 1 hereinbelow compares the molecular weights of the resins in the granules over time and following emulsification. As illustrated, resin molecular weights remain It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process for preparing self emulsifying granules comprising:
   contacting a resin with a highly concentrated surfactant, a neutralizing agent, and water in the absence of an organic solvent to form a mixture;
   melt mixing the mixture;
   forming self-emulsifying granules of the melt mixed mixture of from about 0.5 cm to about 2 cm in diameter.

2. The process according to claim 1, further comprising:
   adding water to the self-emulsifying granules to provide a latex emulsion containing latex particles; and
   continuously recovering the latex particles.

3. The process according to claim 1, wherein the resin comprises a polyester resin selected from the group consisting of amorphous resins, crystalline resins, and combinations thereof.

4. The process according to claim 3, wherein the resin is a mixture of amorphous resins and crystalline resins and the melt mixing is performed at a temperature above the glass transition temperature of the mixture.

5. The process according to claim 1, wherein melt mixing occurs at temperatures of from about 30° C. to about 300° C. and a rate of from about 10 rpm to about 5,000 rpm.

6. The process according to claim 2, wherein the step of adding the water occurs at temperatures of from about 40° C. to about 110° C.

7. The process according to claim 1, wherein the neutralizing agent comprises a solid selected from the group consisting of ammonium hydroxide, potassium hydroxide, sodium hydroxide, sodium carbonate, sodium bicarbonate, lithium hydroxide, potassium carbonate, organoamines, and combinations thereof.

8. The process according to claim 1, wherein the highly concentrated surfactant is a solid selected from the group consisting of anionic surfactants, ionic surfactants, nonionic surfactants, cationic surfactants, and combinations thereof, and the surfactant is present in an amount from about 0.01% to about 20% by weight of the resin.

9. A process for preparing a polyester toner comprising:
contacting a resin with a highly concentrated surfactant, a neutralizing agent, and water in the absence of an organic solvent to form a mixture;
melt mixing the mixture;
forming self-emulsifying granules of the melt mixed mixture of from about 0.5 cm to about 2 cm in diameter;
adding water to the self-emulsifying granules when desired to form a latex emulsion; and
optionally adding one or more additional ingredients of a toner composition to the resin.

10. The process according to claim 9, wherein melt mixing occurs at a temperature of from about 50° C. to about 200° C. and at a rate of from about 10 rpm to about 5,000 rpm.

11. The process according to claim 9, wherein the step of adding the water occurs at temperatures of from about 40° C. to about 110° C.

12. The process according to claim 9, wherein the resin comprises a polyester resin selected from the group consisting of amorphous resins, crystalline resins, and combinations thereof.

13. The process according to claim 9, wherein the surfactant is selected from the group consisting of anionic surfactants, ionic surfactants, nonionic surfactants, cationic surfactants, and combinations thereof, and the surfactant is present in an amount from about 0.01% to about 20% by weight of the resin.

14. The process according to claim 9, wherein the addition of the neutralizing agent raises the pH of the emulsion of resin particles to from about 6 to about 11 and is selected from the group consisting of ammonium hydroxide, potassium hydroxide, sodium hydroxide, sodium carbonate, sodium bicarbonate, lithium hydroxide, potassium carbonate, organoamines, and combinations thereof.

15. A self-emulsifiable granule for a toner composition comprising:
at least one polyester resin in the absence of an organic solvent;
a highly concentrated surfactant;
a neutralization agent; and
water;
wherein the self-emulsifiable granule forms a latex emulsion upon contact with water.

16. The self-emulsifiable granule of claim 15, wherein the at least one polyester resin is selected from the group consisting of amorphous resins, crystalline resins, and combinations thereof.

17. The self-emulsifiable granule of claim 15, wherein the latex emulsion is formed by the addition of water at a temperature of from about 40° C. to about 110° C.

18. The self-emulsifiable granule of claim 15, wherein the surfactant is selected from the group consisting of anionic surfactants, ionic surfactants, nonionic surfactants, cationic surfactants, and combinations thereof.

19. The self-emulsifiable granule of claim 15, wherein the neutralization agent is selected from the group consisting of ammonium hydroxide, potassium hydroxide, sodium hydroxide, sodium carbonate, sodium bicarbonate, lithium hydroxide, potassium carbonate, organoamines, and combinations thereof.

20. The self-emulsifiable granule of claim 15, wherein the self-emulsifying granules are from about 0.5 cm to about 2 cm in diameter.

* * * * *